(12) United States Patent  
Coats

(10) Patent No.: US 8,520,326 B1
(45) Date of Patent: Aug. 27, 2013

(54) GOLF SCORECARD MAGNIFIER

(76) Inventor: William M. Coats, Captiva, FL (US)

(*) Notice: Subject to any disclaimer, the term of this patent is extended or adjusted under 35 U.S.C. 154(b) by 0 days.

(21) Appl. No.: 13/444,326

(22) Filed: Apr. 11, 2012

(51) Int. Cl.
*G02B 25/00* (2006.01)

(52) U.S. Cl.
USPC .......................................................... 359/802

(58) Field of Classification Search
USPC ......... 359/802, 804, 817, 818, 819; 224/274, 224/277
See application file for complete search history.

(56) References Cited

U.S. PATENT DOCUMENTS 6,023,377 A * 2/2000 Slager ........................... 359/802

\* cited by examiner

*Primary Examiner* — Joseph P Martinez
(74) *Attorney, Agent, or Firm* — William E. Noonan

(57) ABSTRACT

A golf card magnifier includes a mounting pin that is receivable in the pencil-receiving slot of a standard golf cart scorecard holder. A pivot arm is attached to the mounting pin and angularly pivotable relative to the card holder. A magnifying lens is pivotally interconnected to an upper end of the pivot arm and adjustably supported above a scorecard on the card holder for viewing the scorecard through the magnifying lens.

20 Claims, 6 Drawing Sheets

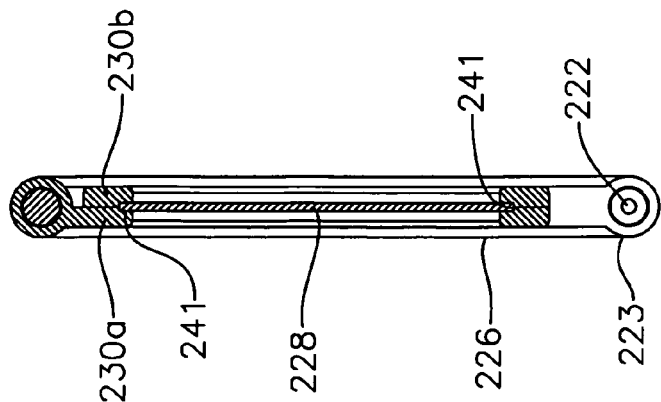
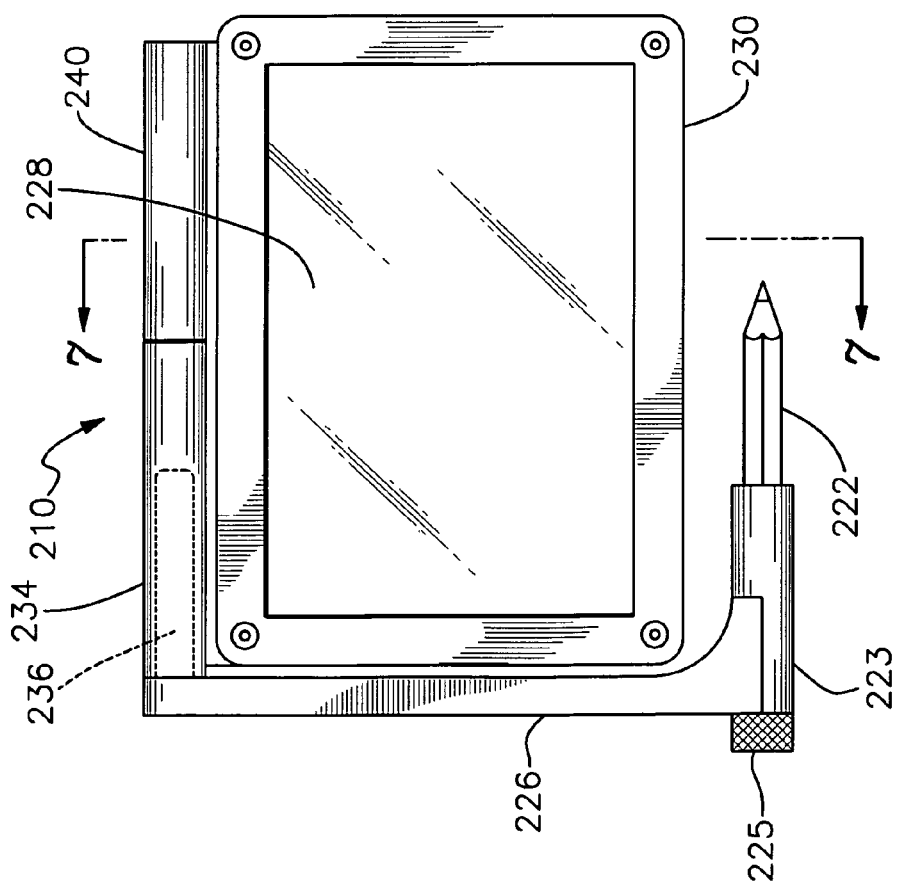

GOLF SCORECARD MAGNIFIER

FIELD OF THE INVENTION

This invention relates to a golf scorecard magnifier and, more particularly, to a magnifying device that is mounted to the scorecard holder of a golf cart.

BACKGROUND OF THE INVENTION

Golf scorecards are often printed in fairly small, fine type. Many golfers experience difficulty reading and entering scores on such cards. This is an especially common problem for older players and those with poor eyesight. Golf card visual aids have been developed. See Stager, U.S. Pat. No. 6,023,377. However, such devices are designed to be carried in the golfer's pocket. Each time a score is entered, the visual aid must be accessed from the user's pocket, opened, manipulated to achieve an appropriate magnification and then returned to the pocket after the score is entered. This is both fairly awkward and time consuming. In addition, the device is apt to be misplaced or lost while the user is driving on a motorized golf cart or is otherwise involved in a round of golf. In addition, some golfers find that carrying an item such as this in their pocket is annoying and can even be distracting, particularly during a golf swing. To date, there are no known scorecard magnifying devices or visual aids that are adapted for mounting directly to the golf cart or convenient for use by a golfer riding in the cart.

SUMMARY OF THE INVENTION

It is therefore an object of the present invention to provide a golf scorecard magnifier that is quickly and easily mounted to the conventional scorecard holder commonly used in motorized or riding golf carts.

It is a further object of this invention to provide a golf scorecard magnifier that allows players to more easily, conveniently and accurately mark the card while seated in a golf cart.

It is a further object of this invention to provide a golf scorecard magnifier, which a golfer does not have to carry in his pocket or otherwise on his person and which instead can be mounted conveniently for use on the golf cart.

It is a further object of this invention to provide a golf scorecard magnifier that is conveniently and reliably accessible for use during a round of golf and is not apt to be dropped or lost by the user while playing a round of golf.

It is a further object of this invention to provide a golf scorecard magnifier that is readily adjustable by the user to provide improved readability and marking of a golf card.

This invention results from a realization that a golf card magnifier may be conveniently and accessibly mounted on the standard card holder of a motorized or riding golf cart by pivotably mounting the magnifier in the conventional pencil-receiving slot of the scorecard holder such that the magnifying lens of the device is adjustably positionable over a scorecard clipped onto the holder. This provides golfers riding in the cart with convenient and easy access to the magnifier, as well as significantly improved, magnified visibility and readability of the scorecard. The magnifier can remain mounted to the scorecard holder during the entire round and does not have to be repeatedly retrieved, opened, closed and stowed each and every time the card is checked or a score is entered.

This invention features a golf scorecard magnifier for use in connection with a scorecard holder attached to the steering wheel of a motorized or riding golf cart. The magnifier is particularly adapted for mounting on a card-supporting clip that is spring biased in a closed condition for clamping and holding a golf card against a tray or panel of the holder. The clip has a pencil-receiving slot formed transversely therethrough and extending generally parallel to the support panel of the holder. The magnifier includes a mounting pin that is insertible into the pencil-receiving slot formed in the card holding clip. A pivot arm is attached to and extends radially from the mounting pin for angularly pivoting toward and away from the card supporting panel. A magnifying lens is pivotally connected to the pivot arm proximate an upper end of the pivot arm. The magnifying lens is pivotable relative to the pivot arm and the pivot arm is pivotable relative to the card holding panel and clip such that the magnifying lens may be adjusted to magnify the card as viewed through the magnifying lens.

In a preferred embodiment, a lower end portion of the pivot arm may be pivotally interconnected to a portion of the mounting pin that extends outside of the pencil-receiving slot of the clip. The magnifying lens may be enclosed by a peripheral frame that is pivotally joined to the upper end of the pivot arm. More particularly, the frame may carry a generally cylindrical bushing and a pivot pin may interconnect the bushing to the pivot arm.

The frame formed peripherally about the magnifying lens may carry a generally cylindrical pencil holder for receiving a scoring pencil therein. The frame may include upper and lower frame sections that are sandwiched about the magnifying lens and secured together to hold the magnifying lens between the frame sections. Each frame section may include an interior peripheral recess for receiving an edge of the lens. Alternatively, the frame may include a molded unit having an interior peripheral channel for receiving the magnifying lens.

BRIEF DESCRIPTION OF THE DRAWINGS

Other objects, features and advantages will occur from the following description of a preferred embodiment and the accompanying drawings, in which:

FIG. 6 is a perspective view of another alternative magnifier according to this invention; and FIG. 7 is a cross sectional view taken along line 7-7 of FIG. 6.

DETAILED DESCRIPTION OF PREFERRED EMBODIMENTS

Figure 1:
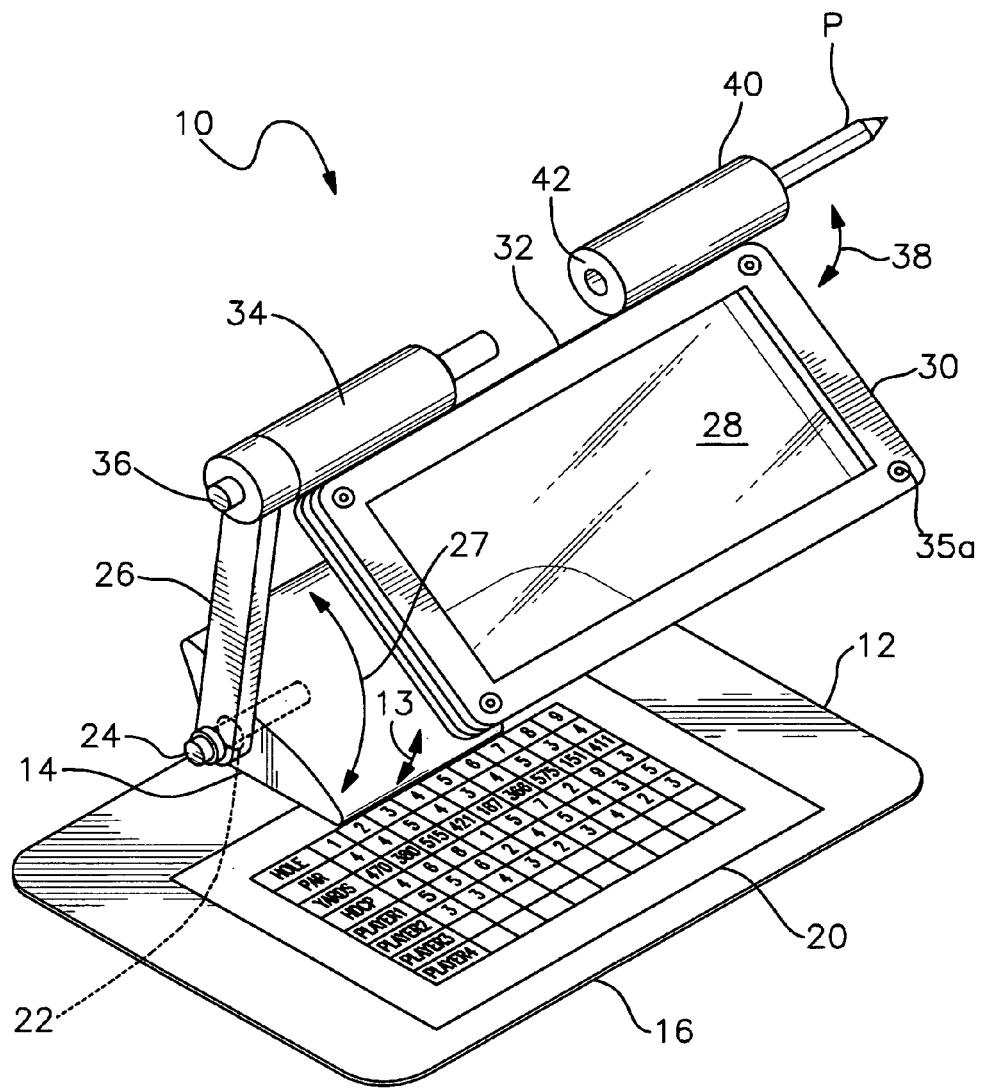
FIG. 1 is a perspective view of a preferred golf scorecard magnifier in accordance with this invention, wherein the magnifier is attached to the spring biased clip of a standard card holder supported on the steering wheel of a motorized or riding golf cart.

There is shown in FIG. 1 a golf card magnifier 10 that is designed to be mounted for use on the standard golf card holder 12 supported by a steering wheel W of a conventional motorized or riding golf cart. It should be understood that magnifier 10 may be used on various types of riding carts, as well as pull carts having a golf card holder as described herein. As shown in FIG. 1, the cart should particularly feature a holder 12 having a spring biased clip 14 attached to an underlying support panel 16 and having a generally horizontally oriented slot formed transversely therein for receiving a standard golf scoring pencil. In a motorized golf cart, as depicted in FIG. 1, panel 16 is secured to the hub and/or spokes of the steering wheel W of the golf cart. Clip 14 is, in turn, molded unitarily with panel 16 or otherwise attached to panel 16 such that the clip is hingedly or pivotably operable as indicated by double-headed arrow 18. More particularly, clip 14 is typically spring biased into a downward or closed condition to hold a golf scorecard 20 securely against underlying panel 16. This construction is conventional and utilized in a wide variety of motorized or riding golf carts. Various versions and means of construction for such holders will be understood by persons skilled in the art.

As further shown in FIG. 1, clip 14 includes a standard pencil-receiving slot 22 that is formed in a side of the clip and extends transversely therethrough. Slot 22 typically extends partially through the body of the clip and is formed generally parallel to the underlying card supporting surface of panel 16. This slot is specifically designed for accommodating a small or short golf pencil of the type conventionally used to keep score on scorecard 20. Slot 22 has a depth, size and shape that snugly receives a standard sized scoring pencil with the eraser end of the pencil projecting out of the slot. The pencil fits snugly and securely in the slot so that it will not fall out of the holder as the cart is driven. Magnifier 10 is specifically designed and constructed to utilize pencil-receiving slot 22 with the scoring pencil removed from the slot. The magnifier is adapted for working equally effectively with various other types of scorecard holders that feature an open pencil-receiving slot extending generally parallel to the plane of the card supporting surface. The magnifier may also be permanently attached to the scorecard holder as described below.

Figure 2:
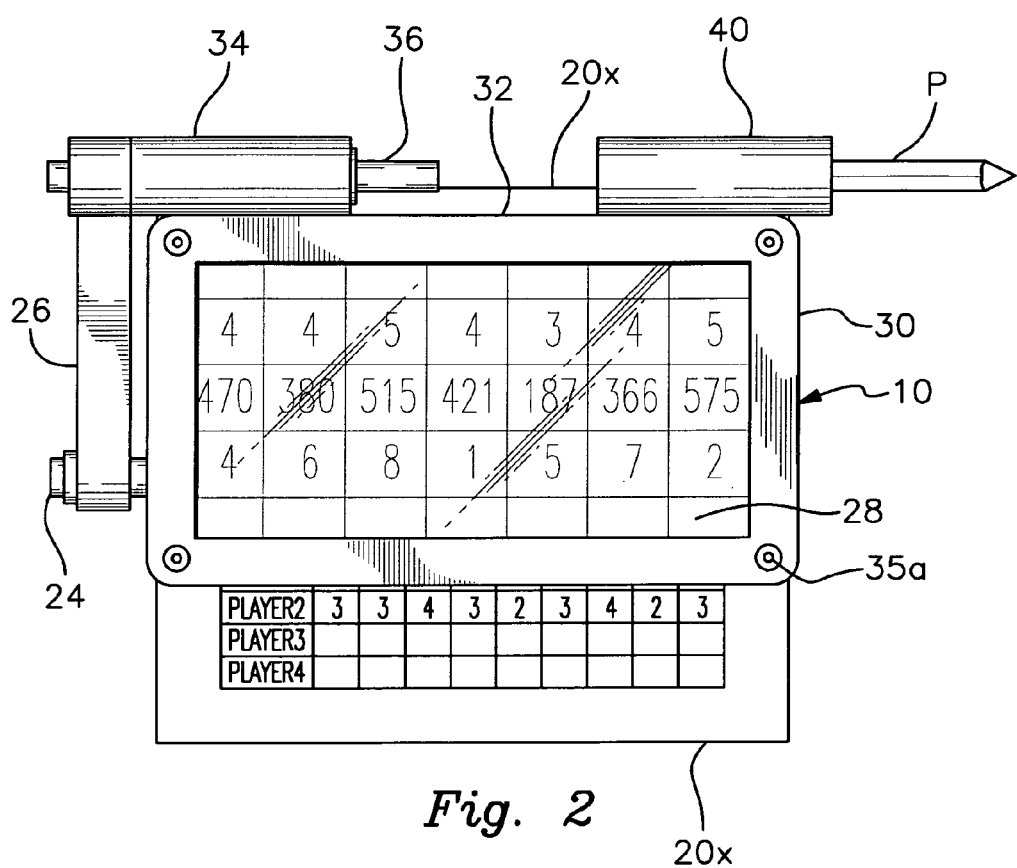
FIG. 2 is a top plan view of the magnifier with a golf scorecard supported thereunder.
Figure 3:
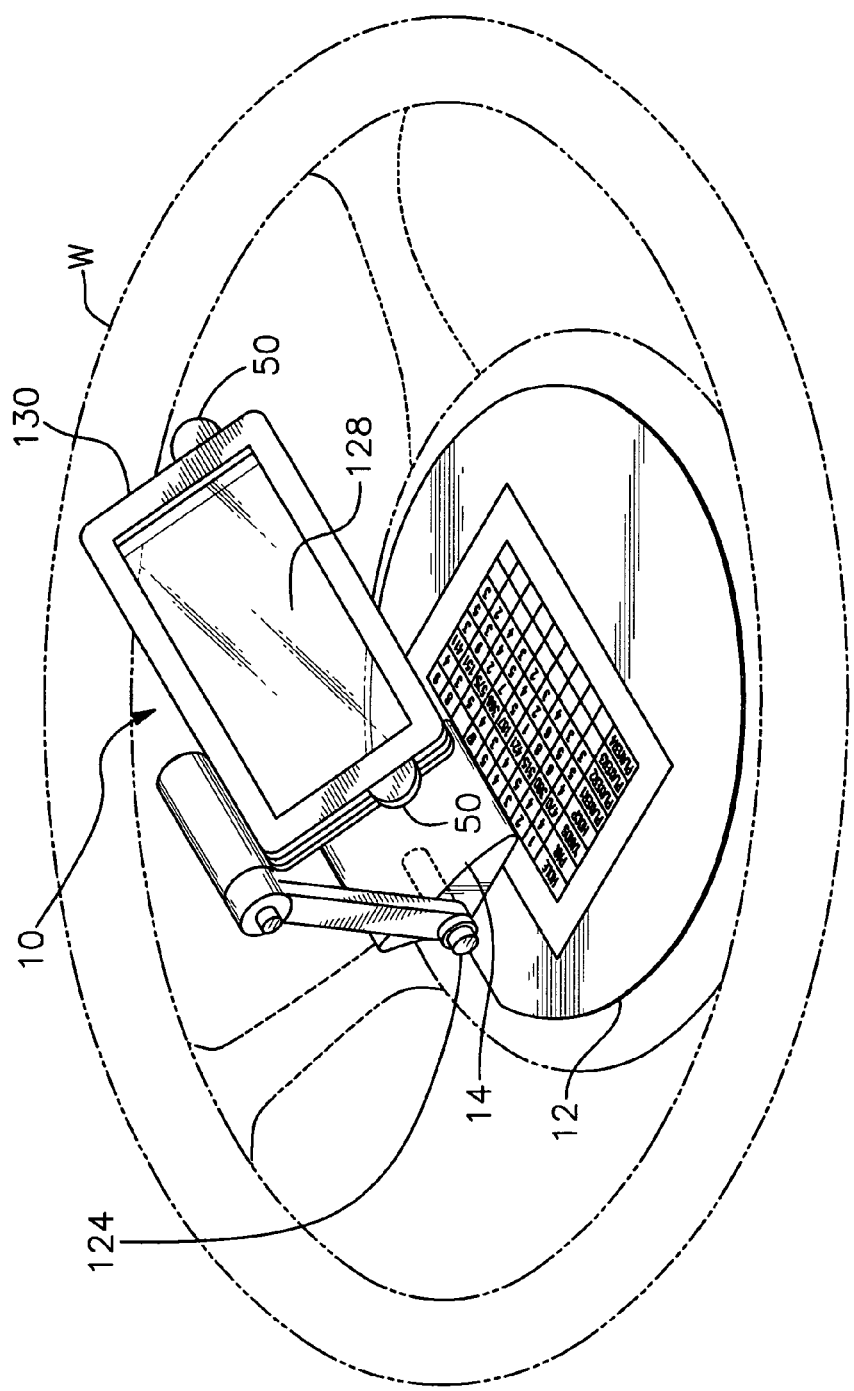
FIG. 3 is a perspective view of an alternative version of the scorecard magnifier, again as mounted on the card holder of a motorized golf cart.

As shown in FIGS. 1 and 2, magnifier 10 includes a mounting pin 24 that is received by slot 22. Pin 24 has a length and diameter comparable to those of a pencil normally received in slot 22. This allows the pin to be snugly and securely received in and extend exteriorly of slot 22. FIG. 3 depicts an analogous mounting pin 124 of alternative magnifier 10a in accordance with this invention similarly received in slot 22 of card retaining clip 14.

Returning to FIGS. 1 and 2, an elongate pivot arm 26 is pivotally connected at a lower end thereof to an end of pin 24 extending exteriorly of slot 22. Pivot arm 26 may be interconnected to mounting pin 24 by various known types of pivot, swivel or hinge mechanisms. The particular form of pivoting interconnection formed between the mounting pin and the pivot arm is not a limitation of this invention. In still other embodiments, the pivot arm 126 may be fixedly attached to the mounting pin and the mounting pin may itself be axially rotatable within the pencil-receiving slot 22. In either event, pivot arm 26 is thereby allowed to pivot relative to underlying panel 16 in the manner indicated by double-headed arrow 27.

Magnifier 10 further includes a magnifying lens 28 that is supported by a peripheral frame 30. The magnifying lens and frame are themselves pivotally interconnected to an upper end of pivot arm 30. In particular, an upper edge 32 of frame 30 is welded, molded or otherwise permanently fastened to a cylindrical bushing 34. A central bore of central bushing 34 receives an elongate pivot pin 36, which in turn interengages pivot arm 26 proximate an upper arm thereof. This interconnection permits the lens assembly 28 and peripheral screen 30 to pivot relative to pivot arm 26 in the manner indicated by double-headed arrow 38, FIG. 1. By pivoting the lens and the pivot arm in the foregoing manner, the golfer is able to achieve a desired degree of visual magnification and focus of underlying card 20.

Magnifier 10 further includes cylindrical pencil holder 40, which is secured permanently (again by welding, molding or other permanent means of attachment) to upper edge 32 of frame 30. Pencil holder 40 is spaced apart from bushing 34 and is positioned generally at the opposite end of upper edge 32, as depicted in FIGS. 1 and 2. Pencil holder 40 has a central opening 42 with a diameter for snugly and retainably receiving a standard pencil P. This pencil is accessed as required to enter scores on scorecard 20.

The mounting pin, pivot arm, bushing, frame and pencil holder may be constructed of various metallic or synthetic materials. When metals or metal alloys are employed, the bushing and pencil holder are typically welded or soldered to the upper edge of the frame. The materials should be selected to provide for smooth and reliable pivoting or swiveling between the respective parts.

Various constructions and configurations may be utilized for magnifying lens 28. The lens preferably features a magnification of approximately 3×, although the magnification may be varied to meet differing golfers' visual requirements within the scope of the invention. Various known magnifying materials including glass and plastic materials may be utilized.

FIG. 3 depicts a slightly modified version of the magnifier 110, which is again mounted on a spring biased clip 14 of a standard golf cart scorecard holder 12. In this version, a pair of frame tabs 50 are provided along the edges of frame 130. These tabs allow the frame and enclosed magnifying lens 128 to be easily pivoted and manipulated to provide a needed magnification of the scorecard held beneath the magnifier and upon the holder 112. The only other significant variation depicted in FIG. 3 from that previously described is that the pencil holder is omitted.

Figure 4:
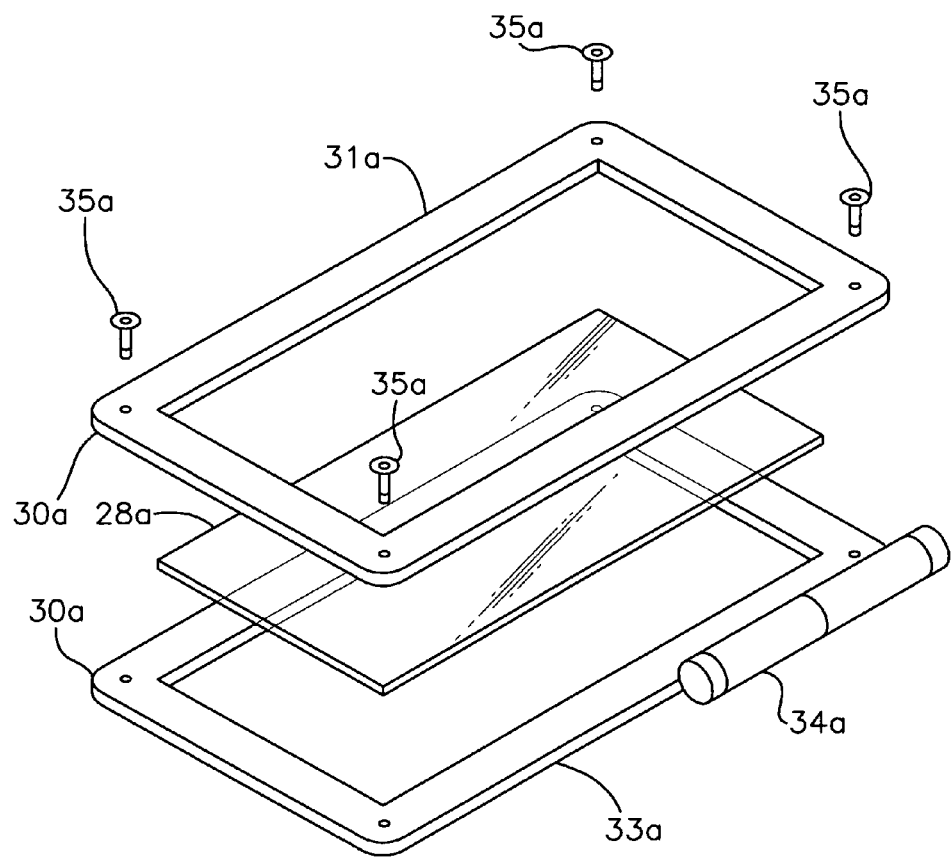
FIG. 4 is an exploded view of a card magnifier in accordance with this invention wherein the frame is sandwiched about the magnifying lens.
Figure 5:
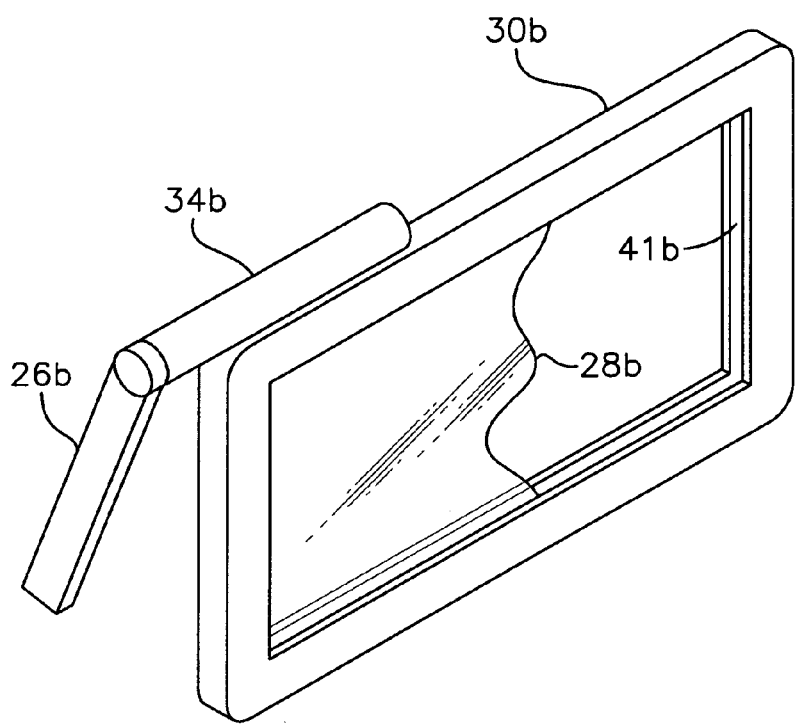
FIG. 5 is a perspective, partly cut away view of an alternative version of the card holder wherein the frame features a molded construction and has an interior channel for receiving the magnifying lens therein.

FIGS. 4 and 5 illustrate alternative ways to construct the lens supporting frame. In particular, as shown in FIG. 4, frame 30a includes upper and lower pieces 31a and 33a, respectively. These pieces are sandwiched about magnifying lens 28a and the assembly is held together by rivets or other types of fasteners 35a. This holds the magnifying lens securely within the frame. A pivot bushing 34a, as previously described, may be secured along an upper edge of the frame, and particularly along the upper edge of piece 33a.

In the alternative version shown in FIG. 5, frame 30b utilizes a one piece molded plastic construction. An interior periphery of frame 30b includes a mounting channel 41b for receiving magnifying lens 28b. A bushing 34b may be molded unitarily with frame 30b or attached permanently thereto by appropriate means. Pivot arm 26b is hingedly secured to bushing 34b in a manner as previously described. As previously indicated, the individual components may include various metals, metal alloys and synthetic substances.

In operation, a magnifier 10, as shown in FIGS. 1 and 2, is mounted to the golf cart for use by golfers riding the cart while playing a round of golf. The scoring pencil is removed from slot 22 (and stored elsewhere) and the mounting pin 24 of magnifier 10 is inserted snugly into the empty pencil slot. Frame 30 and enclosed magnifying lens 28 are thereby supported by pivot arm 26 above the golf scorecard 20 carried on holder 16. As previously described, the pivoting interconnection between pin 24 and arm 26 allows the pivot arm to be adjusted angularly up and down relative to scorecard 20 in the manner indicated by double headed arrow 27. Likewise, the hinged interconnection provided between pin 36 and bushing 34 permits the magnifying lens and peripheral frame to be pivotally adjusted as indicated by double-headed arrow 38. A player riding on the motorized cart is thereby able to quickly and conveniently adjust and focus the magnifying lens to provide a sharp, magnified view of the underlying scorecard 20 through lens 28, which is appropriate and comfortable for that particular player. The golfer is thereby better able to read information (e.g. hole number, yardage, previously entered scores, etc.) contained on the card and to enter scores in a visually clear, accurate and comfortable manner. For example, as depicted in FIG. 2, scorecard 20x is positioned on the golf cart card holder and magnifier 10 is adjusted so that when the card is viewed through lens 28 information, numbers and spaces on the card are conveniently magnified. Each golfer riding the cart may then adjust the magnifier in a similar manner whenever that player needs to read the card or enter a score.

After a score is entered or otherwise between uses of the magnifier, the device may be quickly and conveniently retracted by simply folding pivot arm 26 rearwardly and pivotally closing the frame and magnifying lens so that they are generally co-planar with the pivot arm. The magnifier may alternatively be left in the open condition shown in FIGS. 1 and 2 between uses.

Yet another magnifier 210 in accordance with this invention is depicted in FIGS. 6 and 7. This magnifier includes a mounting pin 222 that is sized and configured to simulate a standard scoring pencil. As a result, pin 222 fits snugly and securely within the standard pencil-receiving slot of the golf cart. A cylindrical lower bushing 223 is pivotally connected to the outer distal end of pin 222. A knurled nut 225 may be rotatably adjusted to loosen or tighten bushing 223. The bushing pivotally interconnects pin 222 to pivot arm 226. An upper pin 236 pivotally interconnects the upper end of pivot arm 226 to a bushing 234, which is cut away in FIG. 6 to clearly show mounting pin 236.

A magnifying lens 228 is enclosed by a rectangular frame 230. The frame is again attached to the upper pivot bushing 234. As in the previously described embodiment, the peripheral frame may include a pair of sections sandwiched about the magnifying lens. As shown in FIG. 7, front frame section 230a and back frame section 230b include complementary peripheral notches having L-shaped cross sections. When the frame sections interengage, as shown in FIG. 7, the respective notches define a peripheral groove or channel 241 for receiving lens 228. Typically, each notch has a width of about 1 mm, such that channel 241 has a total width of approximately 2 mm for accommodating a lens with a width of 2 mm.

FIG. 7 further illustrates a cylindrical pencil holder 240 integrally connected to an upper edge of front frame section 230a. The upper pivot bushing, which is observed in FIG. 7, is similarly connected to the upper edge of back frame section 230b. Cylindrical pencil holder 240 receives a standard scoring pencil as previously described.

Alternatively, a slotted receptacle may be formed around the insider periphery of frame 230 for receiving the lens. The embodiment of FIGS. 6 and 7 operates analogously to the previously described version.

In still other embodiments of this invention, a scorecard magnifier may be permanently mounted to the card holder of the golf cart. In such versions, a pivot arm, as previously described, is pivotally connected by a pin, hinge, swivel or other pivoting mechanism to the cardholder such that the pivot arm is angularly pivotable relative to the upper card-supporting surface of the card holder. In certain embodiments, a pin as previously described, may be permanently secured to the holder. In other versions a bracket may be permanently or releasably fastened to the card holder or formed integrally therewith. A pivot arm, as previously described, is then pivotally connected to the bracket such that the pivot arm is pivoted up and down relative to the card holder in the manner described above. In each such embodiment, a magnifying lens is pivotally connected proximate an upper end of the pivot arm, again in the manner that has been described. Magnifiers constructed in this fashion are then operated as specified above, to adjust the position of the magnifying lens over the scorecard supported on the card holder. In this way, the card magnifier is either permanently attached to the card holder or releasably attached by means other than the previously described pin for engaging the standard pencil-receiving slot. All manners of attaching the pivot arm to the cardholder are encompassed within the scope and spirit of this invention.

The magnifier of this invention provides golfers with an improved, clear and magnified view of a scorecard mounted on the standard card holder of a golf cart. The magnifier remains mounted to the cart during the entire round and does not have to be retrieved and re-stowed each time it is used. As a result, the risk of losing the magnifier during a round of golf is reduced considerably. In addition, utilizing the magnifier apparatus of this invention does not involve the time and tedium required to use conventional golf cart magnifiers. By the same token, because the magnifier is not designed to be worn in the golfer's pocket, it is less apt to disturb the golfer while playing a round of golf. The magnifier remains immediately and conveniently accessible to each player riding in a cart and is readily adjustable so that each player is provided with improved magnified and focused viewing of the scorecard.

From the foregoing it may be seen that the apparatus of this invention provides for a golf scorecard magnifier adapted to be supported and used on the standard card holder of a golf cart. While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

Other embodiments will occur to those skilled in the art and are within the following claims:

What is claimed is:

1. A golf scorecard magnifier for connection to and use with a scorecard holder attached to a golf cart, which scorecard holder includes an upper surface for supporting a golf scorecard thereon and an elongate pencil-receiving slot formed therein, which pencil-receiving slot extends generally parallel to the card supporting surface of the holder, said magnifier comprising:

a mounting pin for being received by the pencil-receiving slot of the holder and for extending exteriorly of the pencil-receiving slot;

a pivot arm attached and extending transversely to said mounting pin for angularly pivoting toward and away from the card-supporting surface of the holder; and a magnifying lens pivotally interconnected to said pivot arm proximate an upper end of said pivot arm, said magnifying lens being pivotable relative to said pivot arm and said pivot arm being pivotable relative to said holder such that said magnifying lens is selectively adjustable to magnify a card supported on the holder as viewed through said magnifying lens.

2. The magnifier of claim 1 in which said pivot arm has a lower end portion pivotally interconnected to said mounting pin exteriorly of the pencil-receiving slot in said holder.

3. The magnifier of claim 1 in which said magnifying lens is enclosed by a peripheral frame that is pivotally joined to said upper end of said pivot arm.

4. The magnifier of claim 3 in which said peripheral frame carries a generally cylindrical pencil holder for receiving a scoring pencil therein.

5. The magnifier of claim 3 in which said peripheral frame includes upper and lower frame sections that are sandwiched about said magnifying lens and secured together to hold said magnifying lens between said frame sections.

6. The magnifier of claim 3 in which said frame comprises a molded component having a central opening and an interiorly peripheral channel for receiving said magnifying lens therein.

7. The magnifier of claim 1 in which said frame carries a generally cylindrical bushing, said magnifier further including a pivot pin that pivotally interconnects said pivot arm to said bushing.

8. The magnifier of claim 1 in which said pivot arm extends radially from said mounting pin.

9. A golf scorecard magnifier assembly comprising:
 a golf scorecard holder that includes a generally planar upper surface for supporting a golf card thereon and an elongate pencil-receiving slot that extends through said holder generally parallel to said card supporting surface of said holder;
 a mounting pin that is insertible into the pencil-receiving slot;
 a pivot arm attached and extending transversely to said mounting pin for angularly pivoting toward and away from the card-supporting surface of said holder; and
 a magnifying lens pivotally connected to said pivot arm proximate an upper end of said pivot arm, said magnifying lens being pivotable relative to said pivot arm and said pivot arm being pivotable relative to said card supporting surface of said holder for adjusting said magnifying lens to magnify a scorecard supported on said holder as viewed through said magnifying lens.

10. The assembly of claim 9 in which said pivot arm has a lower end portion pivotally interconnected to said mounting pin exteriorly of the pencil-receiving slot in said holder.

11. The assembly of claim 10 in which said mounting pin includes a plurality of longitudinal and substantially flat sides.

12. The assembly of claim 11 further including a lower pivot bushing attached to said pivot arm and axially rotatably receiving said mounting pin.

13. The assembly of claim 9 in which said magnifying lens is enclosed by a peripheral frame that is pivotally joined to said upper end of said pivot arm.

14. The assembly of claim 13 in which said frame carries a generally cylindrical bushing, said magnifier further including a pivot pin that pivotally interconnects said pivot arm to said bushing.

15. The assembly of claim 13 in which said peripheral frame carries a generally cylindrical pencil holder for receiving a scoring pencil therein.

16. The assembly of claim 13 in which said peripheral frame includes upper and lower frame sections that are sandwiched about said magnifying lens and secured together to hold said magnifying lens between said frame sections.

17. The assembly of claim 13 in which said frame comprises a molded component having a central opening and an interior peripheral channel for receiving said magnifying lens therein.

18. The assembly of claim 9 in which said pivot arm extends radially from said mounting pin.

19. A golf scorecard magnifier assembly comprising:
 a golf scorecard holder that includes a generally planar upper surface for supporting a golf card thereon;
 a pivot arm attached hingedly to said scorecard holder for angularly toward and away from said card-supporting surface of said holder;
 a mounting element comprising an elongate pin that is attached to said scorecard holder, said pivot arm being attached and extending transversely to said elongate pin; and
 a magnifying lens pivotally connected to said pivot arm proximate an upper end of said pivot arm, said magnifying glass being pivotable relative to said pivot arm and said pivot arm being pivotable relative to said card-supporting surface of said holder for adjusting said magnifying lens to magnify a scorecard supported on said holder as viewed through said magnifying lens.

20. The assembly of claim 19 in which said magnifying lens is enclosed by a peripheral frame that is pivotally joined to said upper end of said pivot arm.

\* \* \* \* \*